United States Patent [19]

Volat et al.

[11] 3,933,277

[45] Jan. 20, 1976

[54] METHOD AND DEVICE FOR CONTROLLING FLUID PRESSURE

[75] Inventors: Jean-Pierre Volat, Marseille; Fernand Berthoud; Guy Berthoud, both of Belleville-sur-Saone, all of France

[73] Assignee: Berthoud, S.A., Belleville-sur-Soane, France

[22] Filed: Aug. 12, 1974

[21] Appl. No.: 496,732

[30] Foreign Application Priority Data

Aug. 13, 1973 France............................ 73.29510

[52] U.S. Cl. ................. 222/178; 137/115; 222/318
[51] Int. Cl.² ..................... A01C 15/00; L01M 6/00
[58] Field of Search ....... 222/55, 57, 177, 178, 318; 137/115, 116, 117

[56] References Cited
UNITED STATES PATENTS

| | | | |
|---|---|---|---|
| 2,459,000 | 1/1949 | Morris ............................ | 417/300 X |
| 2,594,689 | 4/1952 | Sharp et al. ..................... | 137/117 X |
| 3,450,223 | 6/1969 | Jones ............................. | 222/178 X |
| 3,773,222 | 11/1973 | Fiebiger ............................ | 222/57 |

FOREIGN PATENTS OR APPLICATIONS 832,854  10/1938  France............................... 222/178

Primary Examiner—Allen N. Knowles
Assistant Examiner—Hadd Lane
Attorney, Agent, or Firm—Dowell & Dowell

[57] ABSTRACT

The fluid forced by a pump 1 through a conduit 2 towards a point of use such as a spraying bar 6, passes through a gate valve 7 which generates a pressure drop. The higher pressure P0 and the lower pressure P1 thus determined act on a diaphragm 10 which carries a flap valve member cooperating with a seat 18 formed at the inner end of a discharge tube 15-5 which returns the liquid to the tank from which it is pumped. An auxiliary diaphragm 17 acts in the reverse direction. As soon as the pressure difference P0 − P1 exceeds a given value, the flap valve member 14 closes. It is easily demonstrated that under such conditions the delivery pressure P1 is proportional to the pressure drop P1−P0, irrespective of the flow rate through the nozzles of the sprayer bar 6. If 1 is driven at a constant speed, P1 therefore remains constant.

The invention is particularly applicable to agricultural sprayers.

7 Claims, 5 Drawing Figures

METHOD AND DEVICE FOR CONTROLLING FLUID PRESSURE

This invention relates to the regulation of the pressure of a flow of fluid with respect to its supply and may find an application of particular value in the sphere of control of the quantity of fluid distributed per unit of surface by an agricultural sprayer or other means for the distribution of fluid over a surface.

The invention enables such control to be effected independently of the conditions of use of the said fluid, the said pressure varying as the square of the feed of the said flow.

According to the method of the present invention a pressure loss is produced, as a function of the supply having a predetermined flow cross section, the downstream end of the primary restriction, on the one hand, is connected to the using device and, on the other hand, to a further restriction of variable flow cross section in which the unused portion of said flow is fed and which is controlled by a regulator so as to maintain the pressure to be controlled in proportion or substantially proportional to the said pressure loss.

This regulator preferably comprises counteracting surfaces of different cross sections to which the pressures upstream and downstream of the primary restriction respectively are applied.

According to another or additional feature of the present invention, the controlled pressure is selected by adjusting the flow cross section of the primary restriction.

Under these conditions, the pressure of the fluid upstream of the primary restriction is substantially proportional to the pressure loss caused thereby, this loss of load being itself substantially proportional to the square of the rate of delivery of the flow of fluid.

The present invention may be applied with advantage to the regulating of the quantity of fluid distributed per unit of surface by a spraying machine or other means of supplying fluid in agricultural husbandry.

Sprayer units are known in which a volumetric pump, rotated by the engine of a tractor, forces the fluid contained in a tank towards the spraying conduit on the one hand, and towards a return duct to the tank on the other hand. In order that the quantity of fluid delivered per unit of surface, quantified generally by the term "feed per hectare", may be constant the delivery $Q_1$ of the conduit must vary proportionally to the speed of displacement of the sprayer unit. This is the case for the supply $Q_0$ delivered by the volumetric pump whose speed of rotation varies proportionally to the said speed of displacement. However, since the injectors of the spraying conduit are subjected to a pressure $P_1$, the feed $Q_1$ of the conduit is proportional to the square root of the pressure $P_1$. It is therefore a question of varying the pressure $P_1$ proportionally to the square of the feed $Q_0$. The application of the process to the above-mentioned control makes it possible to solve the problem efficiently, independently of the conditions of use of the feed $Q_1$, that is to say, of the characteristics of the sprayer employed and the nature, e.g. viscosity and specific gravity of the fluid.

Hence, according to the present invention, for regulating the quantity of fluid delivered per unit of surface by a spraying device or the like, the fluid contained in a tank is delivered by a means which causes the delivered supply to vary proportionally to the speed of displacement of the sprayer, for example a volumetric pump, the speed of rotation of which varies proportionally to the said speed of displacement. The pressure of the delivered fluid is regulated according to the delivery of the pump by means of the above-mentioned control process, the fluid flowing through the further restriction is returned to the reservoir, the using device being represented by the sprayer. The choice of delivery per hectare is effected very simply by adjusting the flow cross section of the primary restriction.

A device according to the present invention for controlling the pressure of a flow of fluid according to its supply, comprises: a primary restriction having a predetermined flow cross section through which the fluid flows so as to cause a pressure drop as a function of the supply, the downstream end of the said primary restriction being adapted for connection to the using device, a further restriction having a variable flow cross section, being also connected to the downstream end of the said first restriction for accommodating the unused portion of the flow supplied; a regulator controlling the said further restriction so as to maintain the pressure to be controlled in proportion or substantially proportional to the said pressure drop.

The regulator may comprise counteracting surfaces having different cross sections to which the pressures upstream and downstream of the said first restriction are respectively applied.

The counteracting surfaces may be those of a deformable member, for example one or more diaphragms or displaceable members, for example one or more pistons. In such a case, the restriction is preferably formed by a flap valve co-operating with a valve seat, the seat then preferably being mounted on the displaceable member and the flap valve being fixed.

The primary restriction may be formed by a gate valve, the flow cross section of which may be varied between a minimum and a maximum valve.

A device for regulating the quantity of fluid distributed per unit of surface, by a spraying device or the like distributor, comprises a means of distributing the fluid contained in a tank with a feed varying proportionally to the speed of displacement of the distributor, for example a volumetric pump, the speed of actuation of which varies proportionally to the said speed of displacement, a control device fed by the said fluid distributed in accordance with the above-mentioned control device, the further restriction being connected to the tank and the using device being formed by the distributor, e.g. the spraying device.

Apart from its application to agricultural irrigation, the present invention may be applied in particular to producing, in a simple manner from a constant supply of fluid, an appreciably constant pressure absolutely independent of the conditions of use, whilst the value of this pressure may be selected by simple gate valve adjustment.

The following description and the attached drawings, given merely by way of example, will illustrate how the present invention may be carried into practice.

Figure 1:
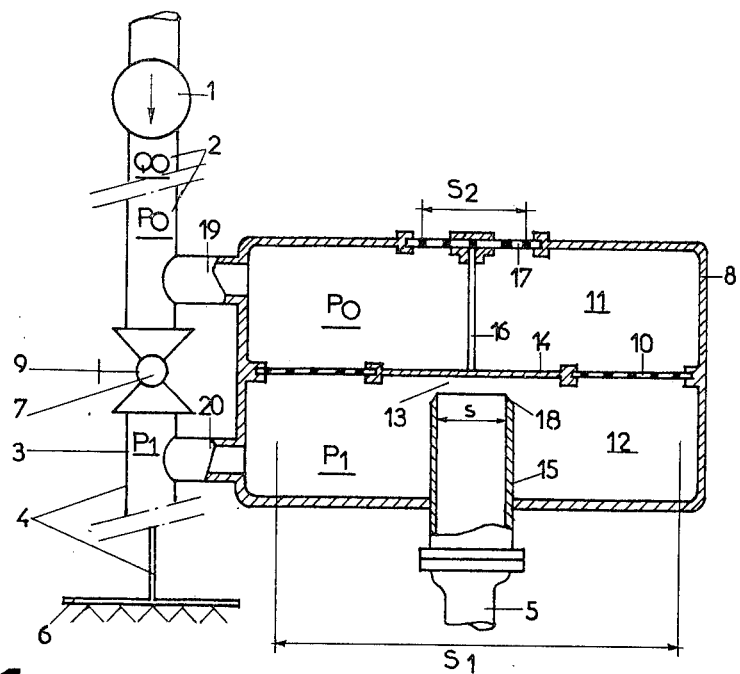
FIG. 1 is a schematic view in cross-section of a device according to the present invention for controlling the pressure of a flow of fluid with respect to its supply.

With reference to FIG. 1, a pump 1 is shown delivering a flow of fluid with a supply $Q_0$ under a pressure $P_0$ to a control unit 3 according to the present invention. This unit distributes the fluid to a delivery conduit 4 and return pipe 5 the conduit 4 feeding a using device 6 which, in the embodiment shown, is a sprayer bar, the pipe 5 possibly communicating with the tank (not shown) containing the fluid delivered by the pump 1.

The control unit 3 comprises two essential members: a gate valve 7 producing a loss of pressure $\Delta P$ and a pressure regulator 8. The gate valve 7, the inlet of which is connected to the pipe 2 and the outlet to the pipe 4, has a flow cross section restriction $\sigma$ adjustable by a control 9 between a minimum value $\sigma m$ and a maximum value $\sigma M$.

The casing of the regulator 8 is divided by a diaphragm 10 into two separate enclosures 11 and 12 communicating respectively along the passage 19 with the pipe 2 upstream of the gate valve 7 where the distributing pressure $P_0$ prevails and, along the passage 20 with the pipe 4 downstream of the gate valve 7 where the using pressure $P_1$ prevails. The enclosure 12 is also connected to the pipe 5 by means of a discharge valve forming a restriction of variable cross section 13. This valve is formed by a plate 14 secured to the diaphragm 10 forming a displaceable flap valve cooperating with a seat having a cross section $s$ formed by the free edge 18 of a fixed pipe 15 passing through the enclosure 12 to communicate with the pipe 5.

The plate 14 is connected by a rod 16 to another diaphragm 17 subjected to the pressure $P_0$ of the fluid in the enclosure 11 on an active surface $S_2$ greater than $s$. The force of the pressure $P_0$ exerted on this diaphragm is opposed to the force exerted by the said pressure on the diaphragm 10 with surface $S_1$.

The fluid under pressure $P_0$ in the enclosure 11 exerts a force F which tends to reduce the flow cross section 13:

$$F = P_0 S_1 - P_0 S_2 = P_0 (S_1 - S_2)$$

in which $S_1$ designates the active surface of diaphragm 10.

The fluid under pressure $P_1$ in the enclosure 12 exerts a force $f$ which tends to increase the flow cross section 13:

$$f = P_1 (S_1 - s),$$

the pressure in the pipe 15 being substantially equal to atmospheric pressure, being the pressure prevailing in the tank.

The diaphragm 10 will be in a state of equilibrium if $F = f$, that is to say, if:

$$\frac{P_0}{P_1} = \frac{S_1 - s}{S_1 - S_2}$$

or:

$$\frac{P_0 - P_1}{P_1} = \frac{S_2 - s}{S_1 - S_2}$$

or again:

$$P_1 = \frac{S_1 - S_2}{S_2 - s}(P_0 - P_1) = \beta \Delta P$$

The regulator 8 ensures the ratio between the pressure $P_1$ and the loss of pressure $\Delta P$ produced by the gate valve 7. The constant coefficient B which is determined by the surfaces $S_1$, $S_2$ and $s$ may be selected so that, for a slight loss of pressure $\Delta P$ the pressure $P_1$ is considerable. For example, B may be selected equal to 10.

If the supply $Q_0$ of the pump 1 increases, the loss of pressure $\Delta P$ increases as the square of this supply, as also does the using pressure $P_1$. A control of the pressure $P_1$ is obtained according to the square of the supply.

If the supply $Q_0$ is constant, the unit 3 represents a constant pressure generator absolutely independent of the conditions of use, whilst the said pressure may be regulated by the control 9.

Figure 2:
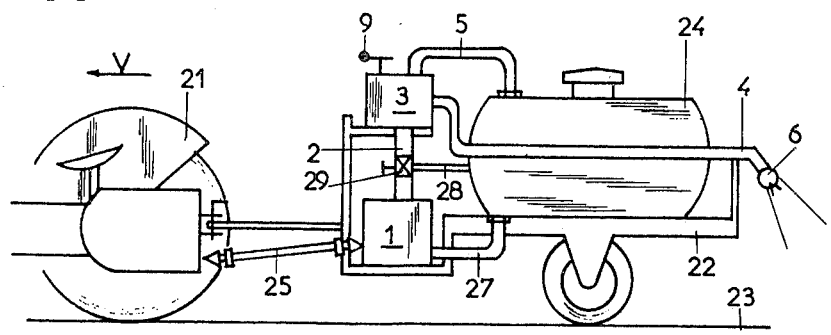
FIGS. 2 and 3 are schematic views of an agricultural sprayer unit, respectively carried behind a tractor, according to the invention.
Figure 3:
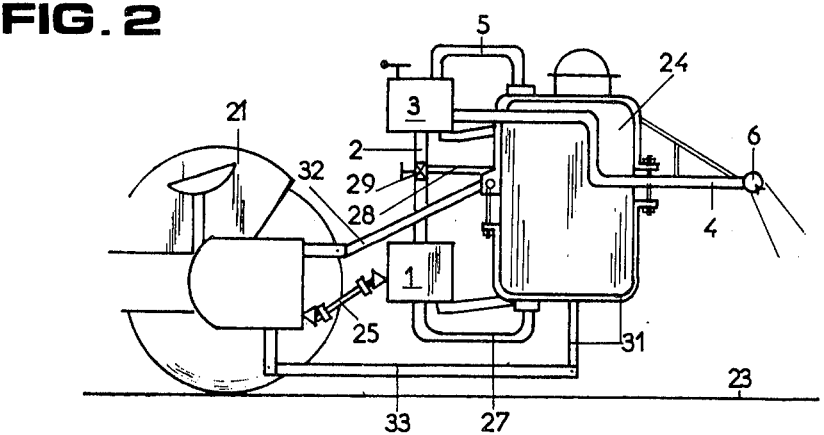

FIGS. 2 and 3 show a particularly preferred application of the invention in the sphere of agricultural irrigation or, more generally, of the distribution of fluid over a surface. This fluid may be a treatment liquid, preferably not subjected to considerable pressurization.

A tractor 21 to which a towed vehicle 22 is connected is shown on the surface 2, moving over a surface 23 to be treated. The towed vehicle 22 carries a tank 24 containing treatment fluid, a volumetric pump 1 rotated by a shaft 25 from the engine of the tractor 21, a control unit 3 and a sprayer bar 6.

The pump 1, connected to the tank 24 by the pipe 27, feeds the fluid to the regulating unit 3 through the pipe 2. This pipe 2 is provided with a three-way gate valve 29 associated with a return pipe 28 to the tank 24. When it is desired to cease the spraying by stopping the pump 1, for example at the end of a field to permit the tractor 21 to turn round, the fluid delivered by the pump is fed to the pipe 28 at reduced pressure. Under normal operation the unit 3 feeds the apertured bar 6 with some of the delivery and returns to the tank 24 the supply remaining in the pipe 5, thus ensuring efficient agitation of the treatment fluid contained in the said tank.

It will be seen that, as shown in FIG. 3, the control unit 3 may be supportively coupled to a tractor without departing from the scope of the present invention. This Figure shows the tank 24, the apertured bar 6, the pump 1 and the control unit 3 carried by a support 31 connected to the tractor 21 by two arms 32 and 33.

The supply from each nozzle of the sprayer bar fed at the pressure $P_1$ is $= k \sqrt{P_1}$, $k$ being a substantially constant coefficient.

If the sprayer bar 6 is provided with N nozzles, the supply from the bar is:
$$Q_1 = N k \sqrt{P_1}.$$

The quantity of fluid delivered by the bar per unit of surface, or delivery per hectare, is:

$$Qha = \frac{N k \sqrt{P_1}}{L V}$$

L being the width of the bar and V being the speed of its displacement.

However, the pressure $P_1$ varies as the square of the supply $Q_0$ due to the action of the unit 3. The delivery $Q_0$ from the volumetric pump 1, being itself proportional to its speed of rotation W and hence to the speed V of displacement, the term $\sqrt{P_1}$ accordingly varies proportionally to V.

The result is that the supply per hectare Qha is substantially constant whatever the speed V of displacement of the sprayer bar. It will be noted that if one or more nozzles are plugged, the pressure $P_1$ is not affected and the delivery per hectare of the other nozzles remains unchanged. The same applies if a portion of the bar is closed. It will also be noted that, for two fluids of different viscosity and/or density, the delivery per hectare is not seriously modified. The effect of variation of viscosity and/or of density at the level of the nozzles of the sprayer bar and tending to modfy its supply is substantially compensated for by an inverse effect at the level of the gate valve 7 tending to modify the loss of load $\Delta P$ and hence the pressure $P_1$.

The desired supply per hectare is selected by adjusting the flow cross section $\sigma$ of the gate valve 7, producing a loss of load $\Delta P$. The control 9 may be associated with a graduation directly giving the desired supply per hectare. However, since this varies with the transmission ratio selected by the gear box of the tractor 21, it may be preferable to graduate the control by indices, the user having directions tabulating or illustrating the index corresponding to a given transmission ratio and supply per hectare.

Hence, the present invention makes it possible to regulate the supply per hectare of agricultural sprayers by simple means, whilst the gate valve 7 may have in particular a relatively large minimum flow cross section $\sigma m$.

The present invention makes it possible to treat the entire surface concerned in a uniform manner and with a precise dosage, in particular avoiding the risk of destruction of plants or involuntary pollution of the environment by spreading an excessive quantity of the treatment product or of ineffective treatments in the event of too small a quantity of the treatment product.

Figure 4:
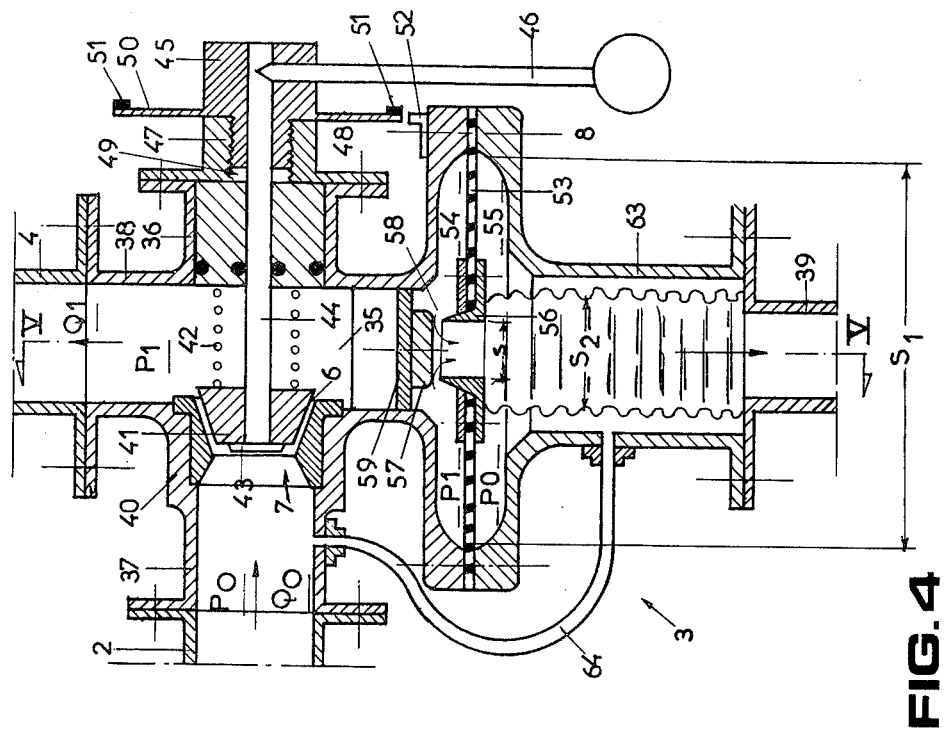
FIG. 4 is a section on line IV — IV of FIG. 5, of another embodiment of a control device according to FIG. 5 is a section on the line V — V of FIG. 4.
Figure 5:
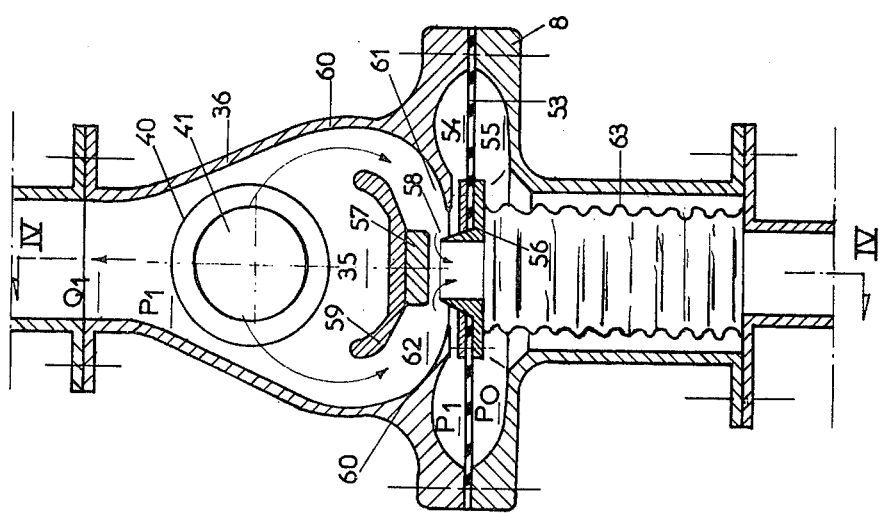

FIGS. 4 and 5 concern a compact embodiment of the controlling unit 3. The body of this unit 36 contains a chamber 35 in communication with an inlet channel 37 connected to the distributing pipe 2 of the pump and two outlet channels 38 and 39, respectively connected to the conduit 4 of the using device and the pipe 5 (not shown). The channel 37 is provided with a conical seat 40 co-operating with a conical flap valve 41 for determining the flow cross section $\sigma$ of the gate valve 7. The flap valve 41 is applied by a spring 42 to a part 43, the said part being connected to a rod 44 passing through the chamber 35 and associated with a control 45. The control 45, actuated by a handle 46, is provided with a screw 47 co-operating with a threaded portion 48 formed in the body 36 in order to cause the flap valve 41 to penetrate more or less into the seat 40. A thrust bearing 49 makes it possible to limit the movement of the flap valve so as to retain a minimum but not zero flow cross section.

The control 45 is also provided with a disc 50, graduated at 51, turning in relation to an index 52. In the event of accidental over-pressure in the delivery pipe 2 of the pump, the flap valve 41 slides along the rod 44 compressing the spring 42 and completely opening the passage in the seat 40.

The outlet channel 39 communicates with the chamber 35 by means of the regulator 8 which, as in the embodiment shown in FIG. 1, comprises a diaphragm 53 having a surface $S_1$ dividing the regulator into two enclosures 54 and 55. In this embodiment the valve seat 56 having cross section $s$ is mobile, mounted on the diaphragm 53 and co-operates with a fixed flap valve 57 to limit a restriction 58 of variable cross section.

The flap valve 57 is secured in the chamber 35 on a cross-piece connecting two parallel walls of the body 36 and having, in cross section, a curved shape partially enclosing the conical seat 40 (see FIG. 5). The wall 60 of the chamber 35 opposed to the said cross bar 59 appreciably matches the shape thereof so as to define two passages 61 and 62 of large flow cross section, on each side of the seat 56 and the flap valve 57.

The fluid flowing through the gate valve 7 must, in order to reach the restriction 58 flow around the cross piece 59 to engage the two passages 61 and 62 of large cross section. It therefore flows at a relatively slow speed, except at the level of the free edge of the seat 56, and the static pressure acting on the diaphragm 53 in the enclosure 54 is practically equal to the total pressure of the fluid, the loss of load between the outlet of the gate valve 7 and the restriction 58 also being very low.

A blower 63, having an effective cross section $S_2$ greater than the cross section $s$ of the seat 56, passes through the enclosure 55 and communicates with the pipe 39. The enclosure 55 is connected to the inlet passage 37 in which the pressure $P_0$ prevails through a pipe 64.

The fact that the flap valve 57 is fixed makes it possible to avoid the interference effect of the reaction due to the quantity of movement of the fluid ejected at the seat 56. This reaction, contained by the fixed flap valve 57, has no influence on the state of equilibrium of the diagphragm 53.

The general operation of this device is identical to that shown in FIG. 1. The gate valve 7 produces a loss of load $\Delta P$ and the regulator maintains the pressure $P_1$ proportional to $\Delta P$, the pressure $P_0$ being equal to $P_1 + \Delta P$.

It will be appreciated that the embodiments which have just been described are only examples and they could be modified by substituting equivalent technical means without departing from the scope of the present invention.

What is claimed is:

1. A regulator device for controlling the pressure of a fluid delivered to a point of use, comprising:
    a conduit through which the fluid is forced towards said point of use;
    means in said conduit to create a pressure drop therein, said means dividing said conduit into an upstream portion and a downstream portion;
    valve discharge means to discharge a fraction of said fluid from said downstream portion of said conduit;
    and movable means having opposed areas responsive to the pressures of said fluid in said upstream portion and in said downstream portion, the areas of said movable means being different and being effective according to the ratio of said areas to actuate said valve discharge means in such manner as to maintain in said downstream portion a pressure dropped in proportion to said ratio.

2. In a regulator device as claimed in claim 1, said movable means responsive to the pressure of said upstream and downstream portions of said conduit comprising diaphragm means sensitive to said pressures, said diaphragm means having a useful effective area for each of said pressures, the effective area which corresponds to the pressure in said upstream portion being lower than the effective area which corresponds to the pressure in said downstream portion.

3. In a regulator device as claimed in claim 2, said means responsive to the pressure of said upstream and downstream portions of said conduit comprising;
    a casing delimited by a wall to define an inner space;

a main diaphragm within said casing to divide said inner space into a first and a second enclosures;

means to respectively connect said first and second enclosures to said upstream and downstream portions, with said wall having an aperture in the portion thereof which delimits said first enclosures;

an auxiliary diaphragm disposed in said aperture to isolate said first enclosure from the outer atmosphere, said auxiliary diaphragm being substantially parallel to said main diaphragm;

means to connect said auxiliary diaphragm with said main diaphragm to form therewith a pressure sensitive unit;

and means to connect said pressure-sensitive unit with said valve discharge means in such manner that any increase of the pressure difference between said first and second enclosures causes closure of said valve discharge means.

4. In a regulator device as claimed in claim 2, said means responsive to the pressure of said upstream and downstream portions of said conduit comprising:

a casing defining an inner space;

a diaphragm within said casing to divide said inner space into a first and a second enclosures;

means to respectively connect said first and second enclosures with said upstream and downstream portions;

and said valve discharge means including:
 a discharge pipe opening within said second enclosure to form a valve seat therein;
 and a movable flap plate carried by said diaphragm to form a movable flap valve member cooperating with said seat in such manner that any increase of the pressure difference between said first and second enclosures causes closure of said valve discharge means.

5. In a regulator device as claimed in claim 2, said means responsive to the pressure of the upstream and the downstream portions of said conduit comprising:

a casing defining an inner space;

a diaphragm within said casing to divide said inner space into a first and a second enclosures;

means to respectively connect said first and second enclosures with said upstream and downstream portions;

and said discharge valve means including:
 a substantially central annular seat member carried by said disphragm, said member opening both sides of said diaphragm;
 a fixed flap valve member carried by said casing within said second enclosure to cooperate with said annular seat member;
 a discharge pipe to receive the fluid passing through said annular seat member, said pipe opening in said first enclosure;
 and connecting means disposed within said first enclosure to connect said annular seat member with said discharge pipe, said last-named connecting means being axially extensible and contractible, being axially insensitive to the pressure prevailing in said first enclosure, and delimiting on the side of said diaphragm facing said first enclosure a surface whose area is greater than the area delimited on said fixed flap valve member by the adjacent end of said annular seat member.

6. A movable agricultural sprayer comprising:

a tank to contain a liquid to be sprayed;

a nozzle carrying sprayer bar to spray liquid from said tank;

a volumetric pump to force liquid from said tank towards said nozzles, said pump having a flow rate proportional to its speed;

means to drive said pump proportionally to the advancing speed of said sprayer;

over-pressure valve means to limit the pressure of the liquid issuing from said pump;

conduit means between said pump and said nozzle carrying sprayer bar;

means to create a pressure drop in said conduit means in such manner as to divide same into a zone of higher pressure and a zone of lower pressure;

valve discharge means to return into said tank liquid from said lower pressure zone;

and means sensitive to the ratio between said higher pressure and said lower pressure to control said valve discharge means to maintain said lower pressure so that it is proportional to the pressure drop in the conduit means, there being opposed areas of the sensitive means which are respectively responsive to said lower and higher pressures which are different from each other in said ratio.

7. A method for controlling the delivery pressure under which a fluid is supplied to a point of use through a conduit into which it is forced with a given flow rate under a pressure higher than said delivery pressure, in order that the latter be proportional to the ratio between said pressures, which consists:

in throttling the passage of said fluid through said conduit in order to create in the latter a zone of higher pressure and a zone of lower pressure;

in causing said higher pressure and said lower pressure to respectively act on opposed counteracting pressure responsive means wherein the means which is responsive to the lower pressure is more sensitive than the means which is responsive to the higher pressure, in such manner that said responsive means will be in equilibrium for said ratio of said higher pressure and said lower pressure;

and in causing said pressure sensitive means to control fluid discharge means connected with said zone of lower pressure in such manner as to progressively close said discharge means as said pressure ratio exceeds a given value.

* * * * *